(12) United States Patent
Büttner et al.

(10) Patent No.: US 10,447,097 B2
(45) Date of Patent: Oct. 15, 2019

(54) METHOD FOR PRODUCING AN ELECTRIC METAL SHEET FOR AN ELECTRIC MACHINE

(71) Applicant: SIEMENS AKTIENGESELLSCHAFT, München (DE)

(72) Inventors: Klaus Büttner, Hollstadt (DE); Klaus Kirchner, Ostheim (DE); Matthias Warmuth, Windshausen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 16/070,217

(22) PCT Filed: Nov. 9, 2016

(86) PCT No.: PCT/EP2016/077120
§ 371 (c)(1),
(2) Date: Jul. 13, 2018

(87) PCT Pub. No.: WO2017/121511
PCT Pub. Date: Jul. 20, 2017

(65) Prior Publication Data
US 2019/0020232 A1    Jan. 17, 2019

(30) Foreign Application Priority Data
Jan. 14, 2016    (EP) .................... 16151282

(51) Int. Cl.
*H02K 1/22* (2006.01)
*H02K 1/02* (2006.01)
(Continued)

(52) U.S. Cl.
CPC .............. *H02K 1/22* (2013.01); *B32B 3/266* (2013.01); *B32B 15/04* (2013.01); *B33Y 80/00* (2014.12);
(Continued)

(58) Field of Classification Search
CPC ........................................ H02K 1/22
(Continued)

(56) References Cited

U.S. PATENT DOCUMENTS 8,836,193 B2    9/2014    Buettner et al.
8,963,394 B2    2/2015    Buettner et al.
(Continued)

FOREIGN PATENT DOCUMENTS

EP    1 130 746 A1    9/2001
EP    2 768 117 A1    6/2014
(Continued)

OTHER PUBLICATIONS

International Search Report issued by the European Patent Office in International Application PCT/EP2016/077120.
(Continued)

*Primary Examiner* — Brent T O'Hern
(74) *Attorney, Agent, or Firm* — Henry M. Feiereisen LLC (57) ABSTRACT

In a method for producing an electric metal sheet for an electric machine, an individual sheet is punched out from a magnetizable sheet blank. A plurality of cut-outs are formed in the individual sheet; and a web is applied in each of the cut-outs by a 3-D printing process from a non-magnetizable material, such that the webs are arranged either in parallel relation to a first q-axis at a pre-determined spacing from the first g-axis, or a first plurality of the webs is arranged exclusively on a first circular segment defined by a first radius and a second plurality of the webs is arranged
(Continued)

exclusively on a second circular segment defined by a second radius which is different in relation to the first radius.

4 Claims, 5 Drawing Sheets

(51) Int. Cl.
    *H02K 1/24*         (2006.01)
    *H02K 15/02*       (2006.01)
    *B33Y 80/00*       (2015.01)
    *B32B 3/26*        (2006.01)
    *B32B 15/04*       (2006.01)

(52) U.S. Cl.
    CPC ............... *H02K 1/02* (2013.01); *H02K 1/246* (2013.01); *H02K 15/02* (2013.01); *H02K 15/022* (2013.01); *B32B 2307/202* (2013.01); *B32B 2307/206* (2013.01); *B32B 2307/208* (2013.01)

(58) Field of Classification Search
    USPC ........................................................ 428/66.6
    See application file for complete search history.

(56) References Cited

U.S. PATENT DOCUMENTS

| | | |
|---|---|---|
| 9,257,883 B2 | 2/2016 | Buettner et al. |
| 9,281,728 B2 | 3/2016 | Buettner et al. |
| 9,287,754 B2 | 3/2016 | Buettner et al. |
| 9,515,536 B2 | 12/2016 | Buettner et al. |
| 9,768,666 B2 | 9/2017 | Buttner et al. |
| 9,787,164 B2 | 10/2017 | Buettner et al. |
| 9,876,411 B2 | 1/2018 | Buettner et al. |
| 9,935,519 B2 | 4/2018 | Buettner et al. |
| 2001/0026108 A1 | 10/2001 | Tajima et al. |
| 2007/0096588 A1 | 5/2007 | Kirchner et al. |
| 2011/0316380 A1 | 12/2011 | Buettner et al. |
| 2012/0133236 A1 | 5/2012 | Buettner et al. |
| 2012/0169158 A1 | 7/2012 | Buettner et al. |
| 2012/0187796 A1 | 7/2012 | Buettner et al. |
| 2013/0234543 A1 | 9/2013 | Buettner et al. |
| 2013/0257197 A1 | 10/2013 | Buettner et al. |
| 2014/0217840 A1 | 8/2014 | Buettner et al. |
| 2014/0246947 A1* | 9/2014 | Evans ................. H02K 1/02 310/272 |
| 2015/0042185 A1 | 2/2015 | Buettner et al. |
| 2015/0207378 A1 | 7/2015 | Buettner et al. |
| 2015/0214810 A1 | 7/2015 | Buettner et al. |
| 2015/0244214 A1 | 8/2015 | Kreidler et al. |
| 2015/0349616 A1 | 12/2015 | Buettner et al. |
| 2016/0056673 A1 | 2/2016 | Buettner et al. |
| 2017/0012481 A1 | 1/2017 | Buettner et al. |
| 2017/0170703 A1 | 6/2017 | Buettner et al. |
| 2018/0083500 A1 | 3/2018 | Buettner et al. |

FOREIGN PATENT DOCUMENTS

| | | |
|---|---|---|
| JP | 2002-095227 A | 3/2002 |
| RU | 2241296 C1 | 11/2004 |
| SU | 1760602 A1 | 11/2004 |
| WO | WO 2013-045142 A2 | 4/2013 |

OTHER PUBLICATIONS

European Search Report dated Jul. 15, 2016 with respect to counterpart European patent application EP 16 15 1282.

Translation of European Search Report dated Jul. 15, 2016 with respect to counterpart European patent application EP 16 15 1282.

\* cited by examiner

METHOD FOR PRODUCING AN ELECTRIC METAL SHEET FOR AN ELECTRIC MACHINE

CROSS-REFERENCES TO RELATED APPLICATIONS

This application is the U.S. National Stage of International Application No. PCT/EP2016/077130, filed Nov. 9, 2016, which designated the United States and has been published as International Publication No. WO 2017/121511 and which claims the priority of European Patent Application, Serial No. 16151282.7, filed Jan. 14, 2016, pursuant to 35 U.S.C. 119(a)-(d).

BACKGROUND OF THE INVENTION

The present invention relates to an electric metal sheet for an electric machine, the main body of which is an individual sheet made of a magnetizable material, the individual sheet having a plurality of cut-outs. Furthermore, the present invention relates to a method for producing an electric metal sheet for an electric machine by punching out an individual sheet made of a magnetizable sheet blank, the individual sheet having a plurality of cut-outs. The expression "electric metal sheet" is used here not as a material name but as a designation for a single, ready formed metal sheet which is typically stacked together with identical sheets to form a sheet stack for an electric machine.

An electric machine is herein understood to be a motor, a generator or alternatively a transformer. In particular, electric metal sheets are also used for the rotors of motors and generators of the aforementioned type.

For the greatest possible torque yield, the rotor metal sheets are dimensioned so that a reactance is as small as possible in the direction of a q-axis. Usually therefore, many large-area punched holes are provided in the rotor metal sheet in the direction of the q-axis. However, this leads to a weakening of the mechanical stability so that the rotary speed suitability is limited. Through the use of webs, the rotor metal sheet is stabilized against centrifugal forces. However, these webs lead to leakage flux, so that the efficiency of the electric machine is reduced.

Figure 1:
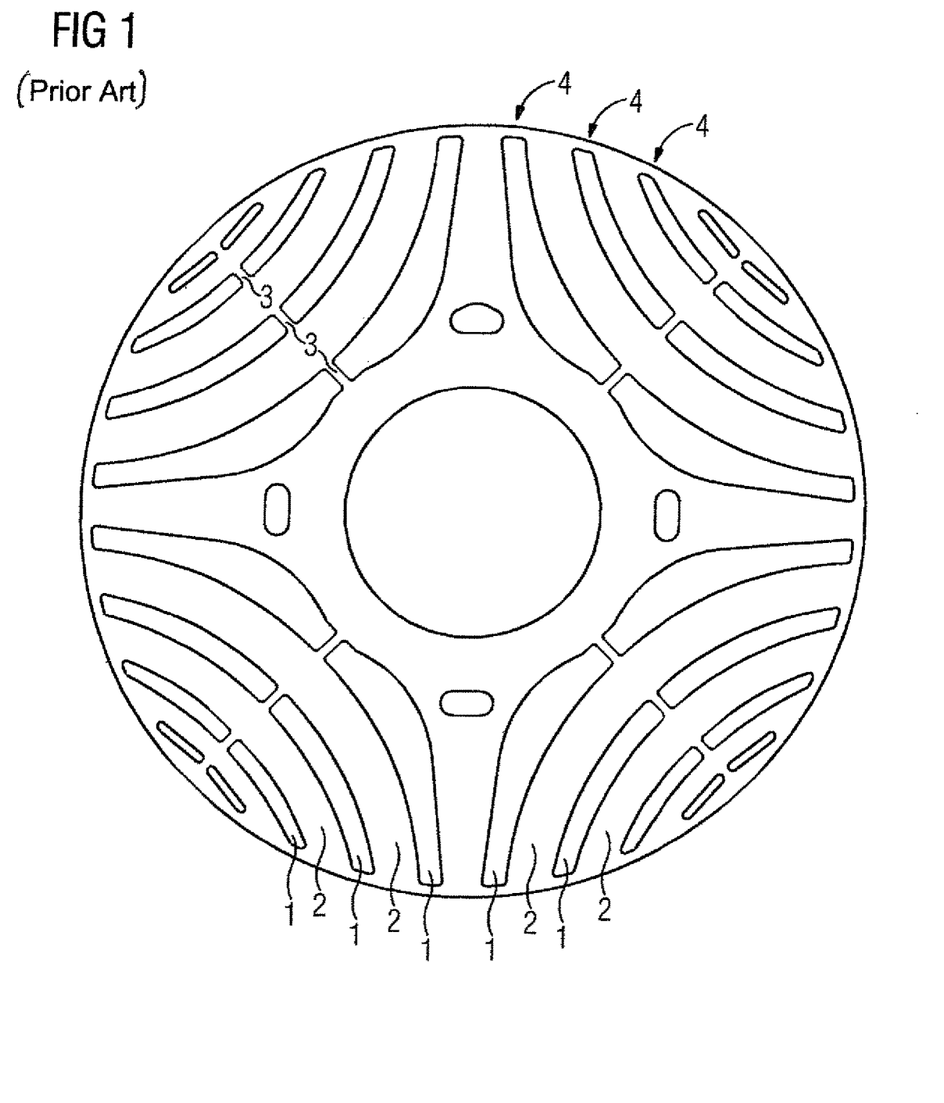
FIG. 1 shows a plan view of a rotor metal sheet according to the prior art.

A rotor metal sheet as shown in FIG. 1 is typically produced by a punching technique. An individual sheet is punched out from a sheet blank. Such individual sheets for a rotor are round and are assembled to a sheet stack which then has the desired magnetic properties of the rotor.

According to the example of FIG. 1, each individual sheet has punched holes 1 for guiding the magnetic field. Flux guidance areas 2 are produced between the punched holes 1. In order to increase the stability of the individual sheet and also of the whole rotor, provided in the cut-outs is a plurality of webs 3 which bridge the cut-outs and lead from a flux guidance area 2 to an adjacent flux guidance area 2. Since the cut-outs 1 are to extend, for magnetic reasons, to the edge of the individual sheet although, for stability reasons, this is not suitable, the individual cut-outs 1 are bridged at the outer periphery of the individual sheet by means of outer webs 4, so that the individual sheet is closed at the periphery. However, the many webs 3 and 4 lead to the aforementioned leakage flux and the resulting efficiency reduction.

The publication EP 2 768 117 A1 discloses a rotor of a reluctance machine with alternating magnetic and non-magnetic regions in the metal sheets. The non-magnetic regions are realized through non-magnetic structures that are provided by means of metallic integral bonding (rapid prototyping) in the intended portions of the metal sheets.

The document WO 2013/045142 A2 also discloses a method for producing a machine component for an electric machine. In order to prevent magnetic short-circuits, separating regions are provided which are created by applying a melting doping element along a region in the axial direction and by subsequent melting of the separating region.

Furthermore, the document JP 2002095227 A discloses a reluctance motor with a mechanically strengthened rotor. Non-magnetic members are integrated into cut-outs of the electric metal sheets.

In addition, the document EP 1 130 746 A1 discloses a rotor with flux barriers for a reluctance motor. In extension of cut-outs, non-magnetic portions are arranged on the outer periphery of each metal sheet.

The object of the present invention therefore lies in providing an electric metal sheet for an electric machine which has increased magnetic efficiency together with high stability. Furthermore, a corresponding production method is to be provided.

SUMMARY OF THE INVENTION

According to the invention, this object is achieved by an electric metal sheet for an electric machine, the main body of which is an individual sheet made of a magnetizable material, the individual sheet having a plurality of cut-outs. The electric metal sheet also has, in each case, at least one web in each of the cut-outs, wherein each web is printed by a 3-D printing method from a non-magnetizable material. Herein, a plurality of the non-magnetizable printed webs are arranged parallel to a first q-axis at a pre-determined spacing from the first q-axis. In addition or alternatively, a plurality of the printed webs are arranged exclusively on a first circular segment with a first radius and a plurality of the printed webs are arranged exclusively on a second circular segment with a second radius different in relation to the first radius.

In an advantageous manner, therefore, the magnetizable individual sheet is enhanced by one or more stabilizing webs which are printed into the cut-outs by a 3-D printing process. The webs then connect adjacent flux guidance areas mechanically, so that an increased stability is achieved. However, a magnetic bridging does not take place since the webs are printed from a non-magnetizable material. A high magnetic efficiency can thereby be ensured.

A special advantage also lies in that the majority of the metal sheet can be produced by a favorable large-scale method and only special regions must be added by a costly additive method. By this means, additional material properties such as, for example, non-ferromagnetic, high strength, etc. can be introduced.

In particular, the printed material can be a non-magnetizable metal.

The individual sheet can have an insulating layer and the printed web can be free from such an insulating layer. This means that the individual sheet can be punched out of a typically insulated sheet blank, while the printed webs do not receive any additional insulation after the printing. By this means, the production of the webs can be simplified, although it should be ensured that the individual webs do not touch one another.

In a special embodiment, arranged alternatingly at the outer periphery of the electric metal sheet is a plurality of magnetizable portions of the individual sheet and a plurality of the non-magnetizable printed webs. By this means, for example, a closed outer periphery or outer edge of the electric metal sheet can be achieved and nevertheless, due to the non-magnetizable webs, no magnetic leakage flux arises there.

In one embodiment of the electric metal sheet, each of the printed webs is thinner than the sheet thickness of the individual sheet. By this means, it can be ensured that even with a sheet stack, the possibly non-insulated webs do not touch one another.

q-axes typically intersect ideally formed cut-outs of an electric metal sheet. In one embodiment of the invention, a plurality of the non-magnetizable printed webs are arranged parallel to a first q-axis at a pre-determined spacing from the first q-axis. This spacing is preferably very small, so that the respective web can always be arranged almost in the center of the longitudinal extent of the respective cut-out. By means of such a spacing, the preconditions can be created that the webs of electric metal sheets lying over one another do not lie directly over one another.

In a further embodiment, the electric metal sheet has a second q-axis adjacent to the first q-axis and a plurality of the non-magnetizable printed webs are arranged parallel to the second q-axis at a pre-determined spacing from the second q-axis, wherein the printed webs parallel to the first q-axis in a peripheral direction are arranged before the first q-axis and the printed webs parallel to the second q-axis in the peripheral direction are arranged behind the second q-axis. If, therefore, two electric metal sheets of this type are laid over one another, rotated relative to one another such that the first q-axis of the first electric metal sheet lies in coincidence with the second q-axis of the second electric metal sheet, then the printed webs of both metal sheets cannot touch one another due to the offset ensured by the spacings. An electrical insulation of the webs is therefore not necessary.

According to a further embodiment, a plurality of the printed webs can be arranged exclusively on a first circular segment with a first radius and a plurality of the printed webs can be arranged exclusively on a second circular segment with a second radius that is different in relation to the first radius. This relates, in particular, to outer webs which are arranged at the outer periphery of the electric metal sheet. By means of this radial offset, it can again be achieved that on a rotation relative to one another of the electric metal sheets lying over one another, the printed webs do not lie directly over one another and therefore cannot touch one another.

In a special embodiment, the electric metal sheet is subdivided into sectors. The sectors can be varied such that webs of electric metal sheets lying over one another do not touch one another. E.g. in a four-poled motor, there result four sectors, each sector possessing a q-axis, thus four in this example.

In a special embodiment, the first circular segment extends over a first of the sectors and a second sector lying opposite the first, but not over a third sector adjoining the first and not over a fourth sector lying opposite the third sector, and the second circular segment extends over the third sector and the fourth sector, but not over the first and second sector. By means of this different design of the sectors, the pre-conditions can be created that electric metal sheets lying over one another do not lie directly over one another with their outer webs, by the electric metal sheets being rotated relative to one another.

Preferably, the electric metal sheets just described are arranged over one another in an electric metal sheet rotated through such an angle which corresponds to the angle between the first and the second q-axis. The rotation corresponds to 360°/pole count, wherein the pole count is 2, 4, 6, 8 or greater.

As has already been indicated above, an electric machine can be equipped with such a sheet stack which in turn has the aforementioned electric metal sheets. In particular, a rotor of a motor or generator can be provided with such a sheet stack. Thus, the rotor obtains a high degree of stability with simultaneously high efficiency.

The aforementioned object is further achieved by a method for producing an electric metal sheet for an electric machine by punching out an individual sheet from a magnetizable sheet blank, wherein the individual sheet has a plurality of cut-outs, and applying at least one web in one of the cut-outs by means of a 3-D printing process, wherein during the application, the web is formed from a non-magnetizable material, wherein during the application, the web is formed from a non-magnetizable material, wherein a plurality of the non-magnetizable printed webs are arranged parallel to a first q-axis at a pre-determined spacing from the first q-axis, and/or a plurality of the printed webs are arranged exclusively on a first circular segment with a first radius and a plurality of the printed webs are arranged exclusively on a second circular segment with a second radius different in relation to the first radius.

In an advantageous manner, therefore, punched individual sheets are enhanced with printed elements. By this means, the economical punching method can be maintained and simultaneously, the degree of freedom in relation to the selection of the materials of an electric metal sheet can be increased. Specifically, therefore flux guidance portions with readily magnetizable material and stabilizing webs can be realized with a non-magnetizable material.

The functional features mentioned above in relation to the electric metal sheet can also be regarded as method features of the inventive method.

BRIEF DESCRIPTION OF THE DRAWING

The present invention will now be described in greater detail making reference to the accompanying drawings, in which.

DETAILED DESCRIPTION OF PREFERRED EMBODIMENTS

The exemplary embodiments set out in greater detail below represent preferred embodiments of the present invention. It should be noted that the individual features can be realized not only in the combinations described, but also alone or in other technically useful combinations.

In FIGS. 2 to 5, electric metal sheets are represented with which an electric machine and, in particular, a motor or generator can be produced. In particular, the electric metal sheets represented are metal sheets for rotors, i.e. rotor metal sheets. But also other metal sheets of electric machines can be realized with the technology represented. In particular, during the production, a combination of punching out and 3-D printing technology is used, so that e.g. the rotor metal sheet can be produced for an elevated rotary speed with simultaneously high efficiency.

Figure 2:
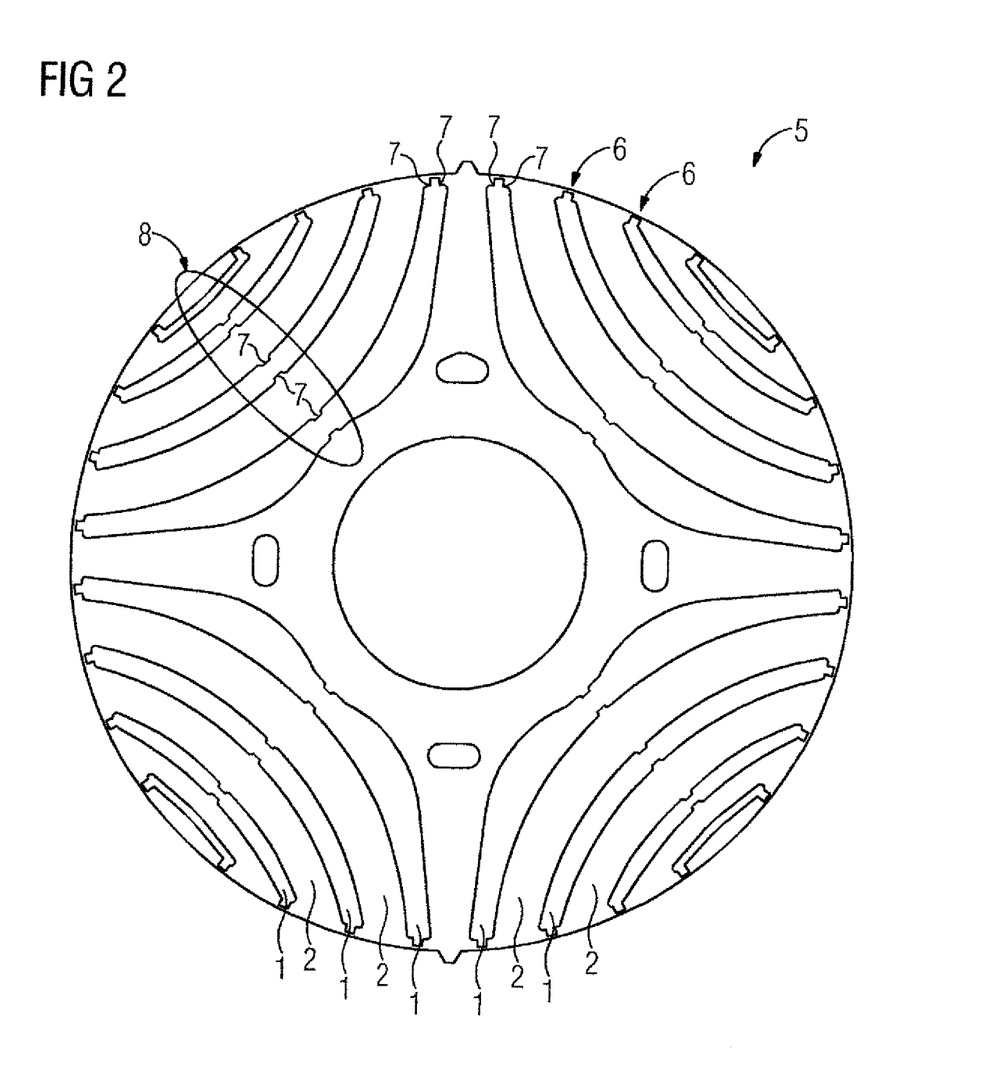
FIG. 2 shows an individual sheet after punching out and before printing.

The metal sheet shown in FIG. 2 is denoted here as an individual sheet 5, as it is punched out of a sheet blank. This individual sheet 5 has cut-outs 1 and flux guidance areas 2 as in the prior art according to FIG. 1. For reasons of stability for the punching process with subsequent handling, the contour of the individual sheet 5 is externally closed before the 3-D printing process. For this purpose, at the end of each punched hole 1, process webs 6 are provided which prevent each cut-out 1 from being open radially outwardly. These process webs 6 are machined off at the end of the production process.

It can furthermore be seen in FIG. 2 that so-called bridgeheads 7 are provided here on each process web 6. These have the purpose that the sections to be printed later are as short as possible and that the printing must not extend over the whole width of a cut-out 1. Even at the sites 8, for example, in the middle of the longitudinal extents of most of the cut-outs 1, such bridgeheads 7 are provided. The bridgeheads 7 are part of the flux guidance areas and are situated at the ends of the webs that are to be printed in later. Herein, they additionally fulfill the task of reducing the temperature influence with 3-D printing (typically laser irradiation) on the surrounding flux guidance areas.

The individual sheet 5 shown in FIG. 2 is thus preferably produced by a punching-out method. In principle, however, it could also be produced by another method, e.g. a laser cutting method. As the sheet blank, typical dynamo or transformer sheet metal can be used which is available on the market and which is typically already provided with an insulating layer.

Figure 3:
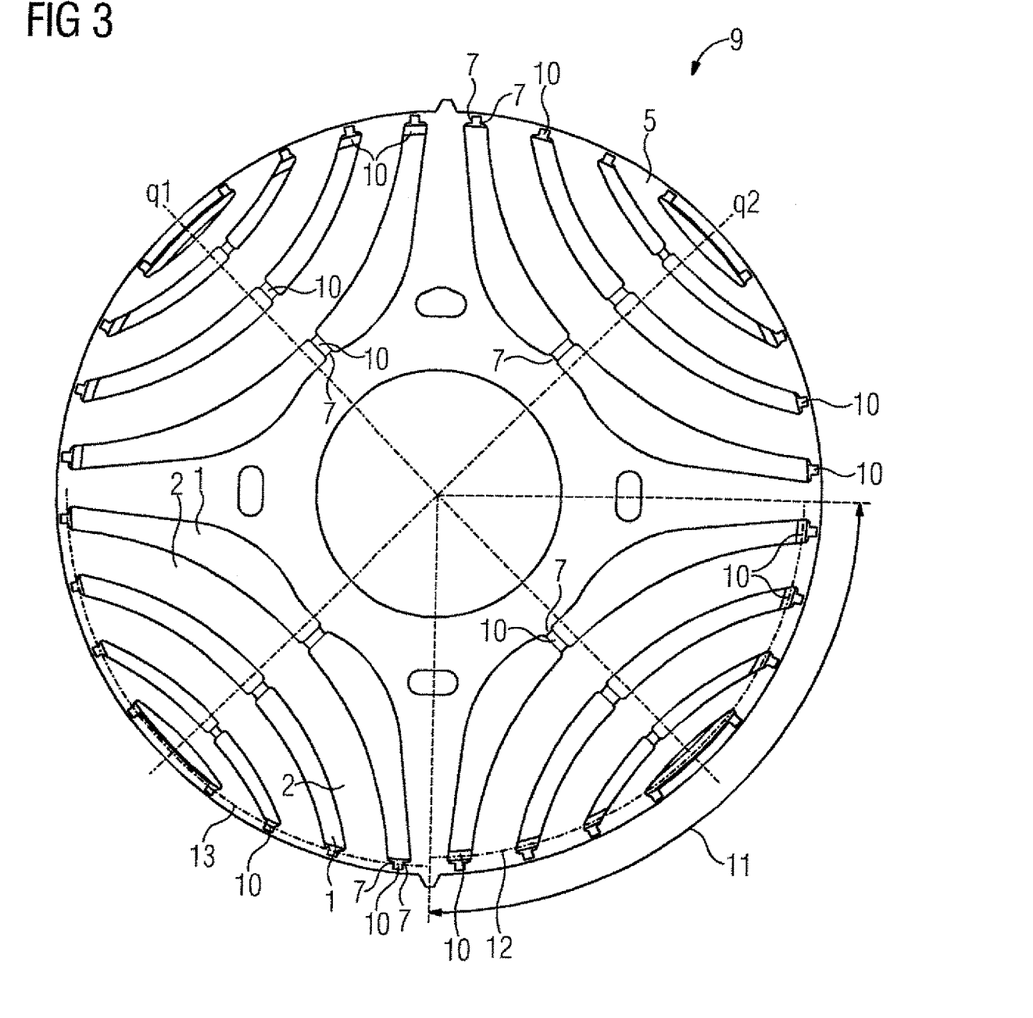
FIG. 3 shows an electric metal sheet based upon the individual sheet of FIG. 2 following printing.

In FIG. 3, a finished electric metal sheet or rotor metal sheet 9 is shown. This was created in a 3-D printing method in which the individual sheet 5 of FIG. 2 was provided with webs 10. In the example of FIG. 3, such webs 10 have been printed on at numerous different sites on the individual sheet 5. These significantly increase the strength or stability of the individual sheet 5. In particular, at most sites at which bridgeheads 7 are also present, such webs 10 are printed on.

In particular, radial webs 10 extend parallel to a first q-axis q1 between corresponding bridgeheads 7. These divide the respective elongate formed punched holes or cut-outs 1. The webs 10, however, do not have to extend parallel to the q-axis q1. They also do not have to extend in a straight line behind one another through all the cut-outs. Rather, they can be distributed differently over the cut-outs 1. Similarly, in the central region of the cut-outs, more than one web 10 can also be provided.

In the example of FIG. 3, the electric metal sheet 9 is divisible according to the pole count into four sectors or quadrants. The center lines of these sectors can form the q-axes q1, q2, etc., which here lie perpendicularly to one another. In machines with larger numbers of poles, the electric metal sheet 9 can also have more than four q-axes. In the simplest case, the electric metal sheet 9 has only one q-axis.

Returning to the example of FIG. 3, here parallel to the second q-axis q2, webs 10 are also arranged at a certain spacing therefrom. In the peripheral direction in the clockwise direction, the webs 10 are situated parallel to the first q-axis q1 therebehind and the webs 10 are situated parallel to the second q-axis q2 therebefore. In the counterclockwise direction, this is inverted. This arrangement of the webs has significance on stacking of a plurality of electric metal sheets, which will be described in relation to FIG. 4.

The electric metal sheet 9 can, as mentioned, be subdivided into sectors 11 wherein the q-axes are each bisecting lines. In the example of FIG. 3, the sectors represent quadrants. In the quadrants 11 drawn into FIG. 3, a first circular segment 12 extends close to the outer edge. The first circular segment 12 begins and ends at the limits of the quadrant 11. These limits, however, are not obligatory. The first circular segment 12 is situated on a first radius about the center of the electric metal sheet 9. Webs 10 are printed in the 3-D printing process onto the first circular segment 12 in the respective cut-out 1. The webs 10 are at most flush with the surfaces of the metal sheet 5 or are thinner than the metal sheet 5.

In the quadrant arranged opposing the quadrant 11 there are also webs 10 on a circular segment with the same radius as that of the circular segment 12.

In a quadrant directly adjacent to the quadrant 11, a second circular segment 13 is also provided on the outer edge of the individual sheet 5. This second circular segment 13 has a somewhat larger radius than that of the circular segment 12. This also begins and ends in this example at the limits of the quadrant. In the 3-D printing process, webs 10 are again printed into the cut-outs 1 between the bridgeheads 7. In the same way, webs 10 are printed into the opposing quadrants.

Figure 4:
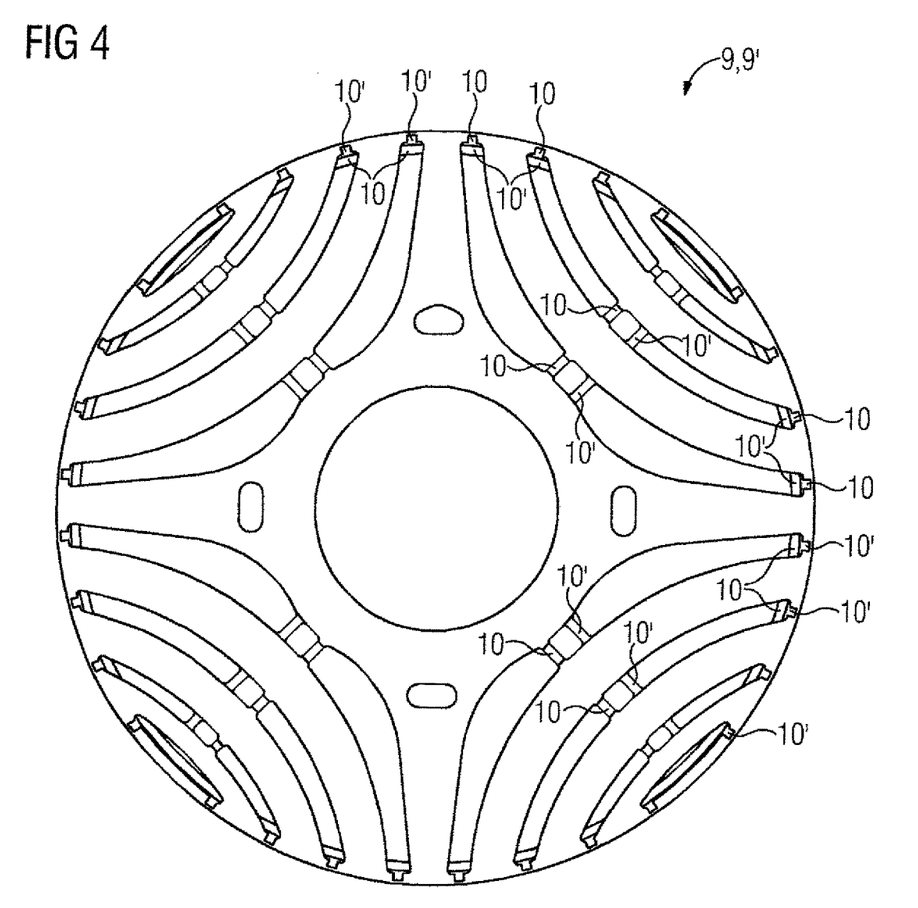
FIG. 4 shows two electric metal sheets of the type of FIG. 3 arranged rotated over one another.
Figure 5:
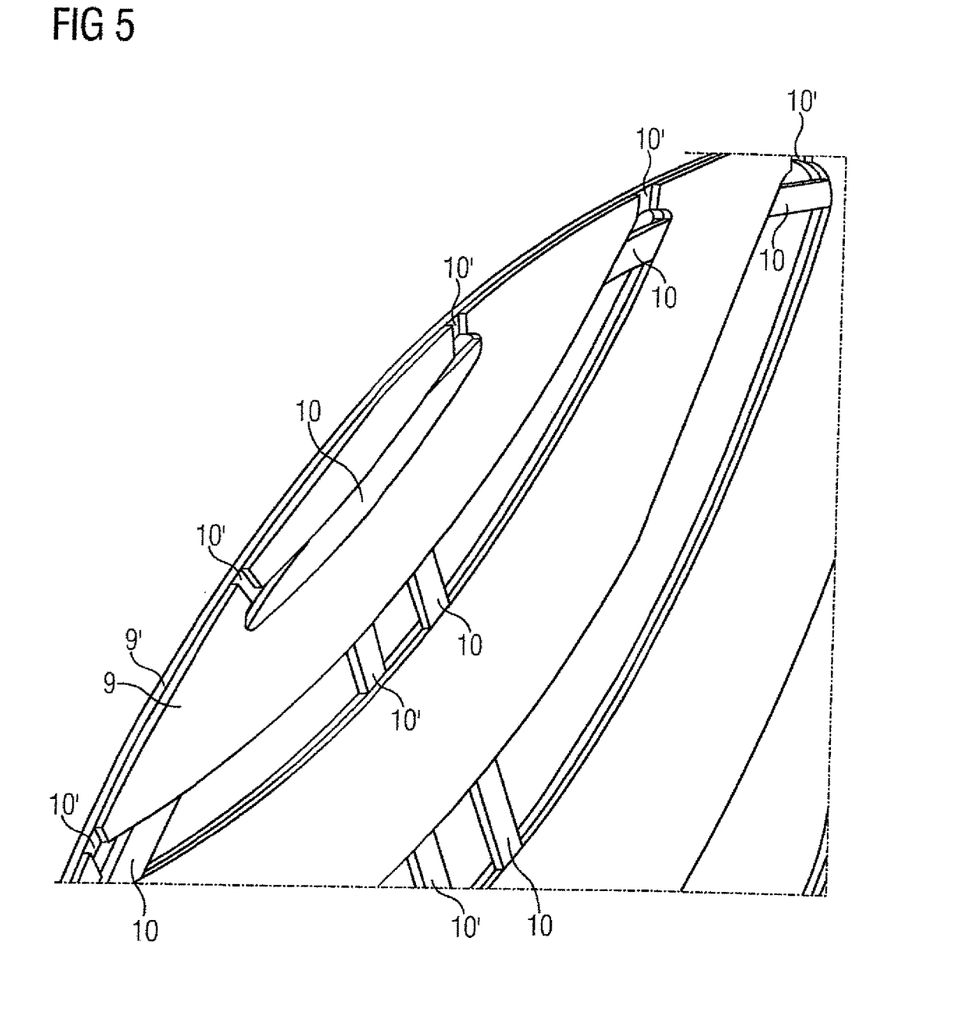
FIG. 5 shows a portion of the electric metal sheet pair of FIG. 4.

From FIGS. 4 and 5, only the direction of these special positionings of the webs 10 can be seen. This principle of the positioning can, however, be transferred to other geometries of the electric metal sheets 9, specifically also to those with at least one and more q-axes. The radii of the circular segments or the spacings from the q-axes should herein suitably be selected so that with two electric metal sheets 9 lying directly over one another, the printed-on webs 10 do not lie directly over one another if the two electric metal sheets 9 are rotated relative to one another, preferably by a sector size.

In FIG. 4, two electric metal sheets 9 and 9' are shown in a plan view. The two electric metal sheets 9 and 9' are constructed exactly identically. They are merely rotated relative to one another through 90 degrees, i.e. through one sector size or quadrant size. While the upper electric metal sheet 9 has webs 10, the lower electric metal sheet 9' has the webs 10'. In the upper right-hand quadrant (with respect to FIG. 4), therefore, the webs 10 of the upper electric metal sheet 9 lie entirely outwardly, whereas the webs 10' of the lower electric metal sheet 9' lie somewhat further inwardly. The webs 10 and 10' do not touch one another. In the quadrants at bottom left in FIG. 4, the arrangement of the webs 10 and 10' is reversed. This specific change continues per quadrant at the periphery. Similarly, the webs 10 of the upper electric metal sheet 9 lie in the clockwise direction before the q-axis q2 (cf. FIG. 3) and the webs 10' of the lower electric metal sheet 9' lie behind the q-axis q2. At the first q-axis q1, this is reversed. In this case also, the webs 10 and 10' do not touch one another, since they have the corresponding spacing from the respective q-axes.

Furthermore, it is shown in FIG. 4 that the process webs 6 (cf. FIG. 2) have been machined off. By this means, the rotor outer diameter is created for the required air gap. Through the removal of the process webs 6, no webs that would reduce the efficiency are still present. The leakage flux is prevented since all the webs 10 and 10' are not magnetizable.

FIG. 5 shows a portion of the electric metal sheet pair of FIG. 4 in a perspective view. It is clearly apparent here that the two electric metal sheets 9 and 9' lie over one another. The webs 10 therefore lie substantially in the central plane of the upper electric metal sheet 9 and the webs 10' lie in the central plane of the lower electric metal sheet 9'. Since corresponding webs 10 and 10' are offset relative to one another either in the peripheral direction or in the radial direction, they do not touch one another. A special electrical insulation of the printed webs is therefore not necessary. The same aim could be achieved if the webs 10 and 10' were thinner than the individual sheets 5 of the electric metal sheets 9 or 9'.

In an advantageous manner, therefore, an increase in the rotary speed capability of a rotor produced according to the invention results by increasing the strength with simultaneously the greatest possible efficiency. Furthermore, an improvement in the oscillation behavior can be achieved in that for example, through the 3-D printing, the webs are printed at positions which evoke intrinsic resonances at non-significant frequency positions.

By means of the punching technique, many insulated electric metal sheets are available. These electric metal sheets are optimized in their properties for use in electric motor technology. These optimizations relate, in particular, to the properties: non-magnetization losses, magnetic polarization, permeability, saturation polarization, coercivity and so on. In addition, the electric metal sheets are already insulated and are available with the coating types C3, C4, C5 and so forth. Alongside this, the punching technique is typically very economical and the production time of a whole individual sheet is typically in the region of one second.

By means of the 3-D printing, a non-magnetic web is printed on only at the prepared regions. Through the offset of the webs, on rotated stacking of the individual sheets (e.g. with four poles, rotation through 90 degrees) a continuous axial contact of the printed-on webs can be prevented, as described above. Specifically, the printed webs lie offset to one another. Thus, as also mentioned above, in an advantageous manner, no additional insulation is required. This advantage, as also indicated above, can also be achieved with webs that are configured somewhat thinner than the metal sheet thickness.

According to the rotary speed requirement, the embodiment of the webs can be flexibly adapted in number or cross-sectional area.

What is claimed is:

1. A method for producing an electric metal sheet for an electric machine, comprising:
   punching out an individual sheet from a magnetizable sheet blank;
   forming a plurality of cut-outs in the individual sheet; and
   applying a web in each of the cut-outs by a 3-D printing process from a non-magnetizable material, such that the webs are arranged at least in one of two ways, a first way in which the webs are arranged in parallel relation to a first g-axis at a pre-determined spacing from the first g-axis, a second way in which a first plurality of the webs is arranged exclusively on a first circular segment defined by a first radius and a second plurality of the webs is arranged exclusively on a second circular segment defined by a second radius which is different in relation to the first radius.

2. The method of claim 1, further comprising applying an insulating layer on the individual sheet, whereas the web has no insulating layer.

3. The method of claim 1, further comprising arranging a plurality of magnetizable portions of the individual sheet and a plurality of the webs alternatingly at an outer periphery of the electric metal sheet.

4. The method of claim 1, further comprising:
   arranging a plurality of the webs in parallel relation to a second q-axis in a peripheral direction behind the second q-axis at a pre-determined spacing from the second q-axis, with the second q-axis extending adjacent to the first q-axis, and
   arranging the webs that are arranged in parallel relation to the first g-axis in the peripheral direction before the first g-axis.

* * * * *